United States Patent [19]

Lehner et al.

[11] Patent Number: 5,039,314
[45] Date of Patent: Aug. 13, 1991

[54] METHOD FOR PRODUCING OXYGEN AND/OR OZONE

[75] Inventor: Franz J. Lehner, Pasching; Rainer Wawrina, Leonding, both of Austria

[73] Assignee: Voest-Alpine Industrienlagenbau Gesellschaft m.b.H., Linz, Austria

[21] Appl. No.: 542,779

[22] Filed: Jun. 25, 1990

[30] Foreign Application Priority Data

Jun. 26, 1989 [AT] Austria .................................. 1560/89

[51] Int. Cl.$^5$ .......................................... B01D 53/04
[52] U.S. Cl. ........................................ 55/26; 55/31; 55/58; 55/62; 55/68; 55/75; 423/581
[58] Field of Search .................. 55/25, 26, 31, 33, 58, 55/62, 68, 74, 75; 423/581

[56] References Cited

U.S. PATENT DOCUMENTS

| | | | |
|---|---|---|---|
| 3,922,149 | 11/1975 | Ruder et al. | 55/25 X |
| 4,100,421 | 7/1978 | Tabata et al. | 55/31 X |
| 4,280,824 | 7/1981 | Lassmann et al. | 55/26 |
| 4,430,306 | 2/1984 | Namba et al. | 55/31 X |
| 4,604,279 | 8/1986 | Leitzke et al. | 55/58 X |
| 4,690,696 | 9/1987 | Sircar et al. | 55/26 |
| 4,786,489 | 11/1988 | Grenier et al. | 423/581 |

FOREIGN PATENT DOCUMENTS

| | | | |
|---|---|---|---|
| 0178415 | 4/1986 | European Pat. Off. | 423/581 |
| 0253131 | 1/1988 | European Pat. Off. | 423/581 |
| 0297090 | 12/1988 | European Pat. Off. | |
| 2548198 | 6/1976 | Fed. Rep. of Germany | 423/581 |
| 2641316 | 3/1977 | Fed. Rep. of Germany | 423/581 |
| 2655621 | 6/1977 | Fed. Rep. of Germany | 423/581 |
| 3230922 | 2/1984 | Fed. Rep. of Germany | 423/581 |
| 3632937 | 3/1988 | Fed. Rep. of Germany | 423/581 |
| 49-035512 | 9/1974 | Japan | 423/581 |
| 50-116390 | 9/1975 | Japan | 423/581 |
| 52-003595 | 1/1977 | Japan | 423/581 |
| 52-0017385 | 2/1977 | Japan | 423/581 |
| 52-035788 | 3/1977 | Japan | 423/581 |
| 53-023894 | 3/1978 | Japan | 423/581 |
| 54-024293 | 2/1979 | Japan | 423/581 |
| 56-088805 | 7/1981 | Japan | 423/581 |
| 56-088806 | 7/1981 | Japan | 423/581 |
| 56-114808 | 9/1981 | Japan | 423/581 |
| 59-078909 | 5/1984 | Japan | 423/581 |
| 62-226802 | 10/1987 | Japan | 423/581 |

Primary Examiner—Robert Spitzer
Attorney, Agent, or Firm—Cushman, Darby & Cushman

[57] ABSTRACT

In this method for producing O2 and/or ozone for use in an oxygen consumer and/or an ozone consumer (2, 4), whereby residual oxygen is adsorbed from the consumers and, subsequently, scrubbed in a pressure-swing adsorption system (5); whereby the gas is, at least partially, recirculated to the oxygen consumer or, by preceding it with an ozonizer (3), to the ozone consumer (4); and whereby the amount of oxygen required for the operation of the consumers (2, 4) in addition to the recirculated oxygen is derived from an oxygen source (6, 7) separate from the pressure-swing adsorption system (5) designed for the scrubbing of the recirculated gas.

In this connection, the preferred procedure is to feed the gas desorbed from the pressure-swing adsorption system (5) in the process of regeneration, at least partially, into the gas flow adsorbed from the consumers (2, 4) and to recirculate it via the pressure-swing adsorption system (5).

10 Claims, 1 Drawing Sheet

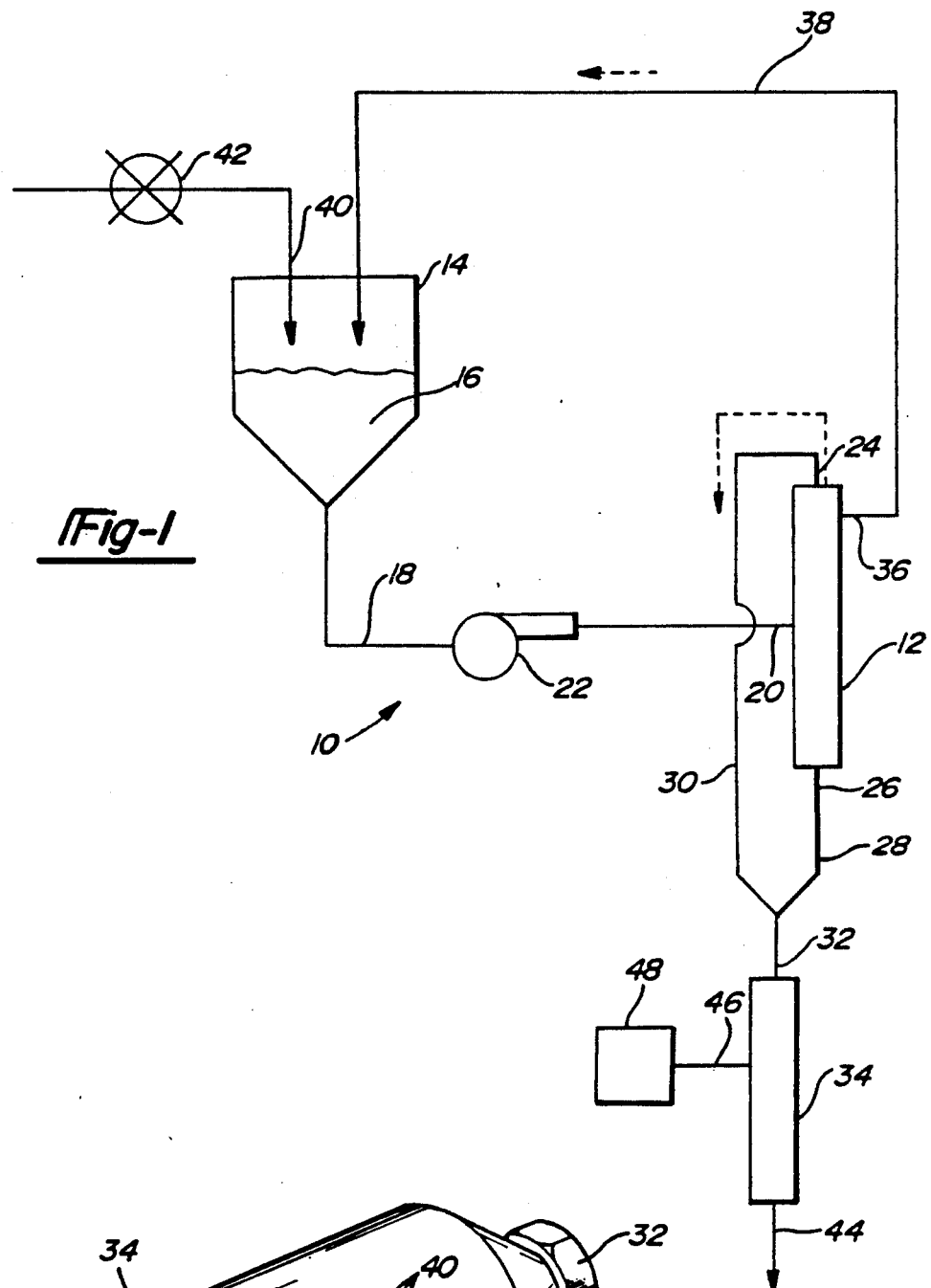
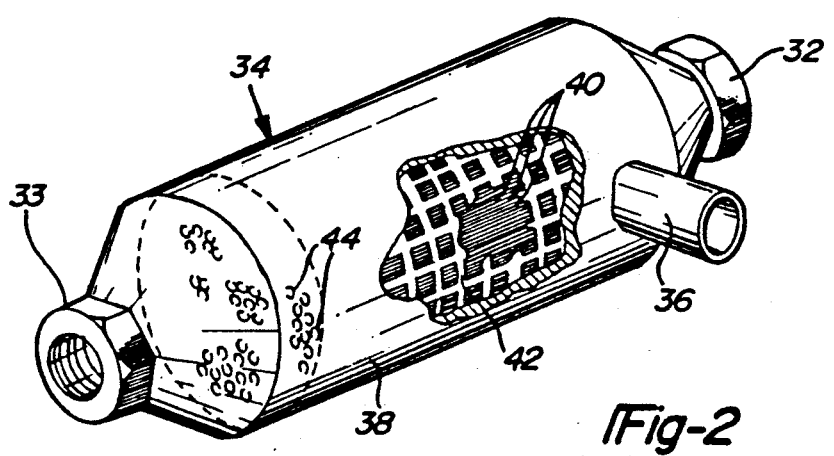

METHOD FOR PRODUCING OXYGEN AND/OR OZONE

The invention relates to a method for producing O2 and/or ozone for use in a consumer of oxygen and/or ozone, whereby residual oxygen is adsorbed, and whereby the oxygen is initially scrubbed in a pressure-swing adsorption system and subsequently recirculated, at least partially, to the oxygen consumer or to the ozone consumer which is preceded by an ozonizer.

In connection with pulp bleaching facilities, regarded as examples of potential ozone consumers, it has long been suggested that the oxygen adsorbed from a bleaching facility be scrubbed and then lead to pass through an ozonizer, whereupon ozone may be recirculated to the bleaching facility. Such recirculation of oxygen is of particular significance in such instances where ozone has been produced from enriched oxygen, especially from gases with a concentration of more than 90% oxygen, because the ozone yield in an ozonizer improves substantially with the use of gases with a high oxygen content as opposed to using regular air. Essentially, maintaining the degree of oxygen enrichment in its gaseous state is facilitated by the recirculation process; depending on the technical nature of the ozone consumer, however, higher or lower quantities of oxygen are used up. This is especially true when oxidizing large quantities of organic materials; alternatively, in the pulp bleaching process, a significant amount of oxygen is consumed within a certain time period. Suggestions have therefore been made, for example in EP-AI 297 090, to perform the scrubbing process in a pressure-swing adsorption system wherein the impurities would be removed from the flow of oxygen, and to supplement from the air the additional quantity which may be required in the previously mentioned pressure-swing adsorption system. Such an arrangement, however, requires large dimensions for the size of the pressure-swing adsorption system since more air, by a power of ten, must pass through the pressure-swing adsorption system, the same one that was used in the scrubbing of the recirculated gas, if, for example, 10% of the amount of oxygen is to be supplemented. In order to achieve the required additional amount of air, which has to be scrubbed in the pressure-swing adsorption system to produce tonnage oxygen, not only does the circumstance have to be weighed that the concentration of oxygen in the air is much lower than in tonnage oxygen. But consideration must also be given to the fact that, when using air for the production of tonnage oxygen, the degree of efficiency achieved by the pressure-swing adsorption system is 50 percent at best. This demonstrates that with the prevailing methods, whereby the recirculated residual oxygen is scrubbed in a pressure-swing adsorption system and the additional amount of oxygen required is generated from the air, using the identical pressure-swing adsorption system, rather large pressure-swing adsorption systems are required to perform this task. At the same time, attention should be paid to the fact that, in the desorption process, significant losses of pure oxygen were incurred.

The objective of the present invention is to develop a method as described above, whereby a higher degree of efficiency is achieved while maintaining the required size of the equipment as small as possible, and while keeping the loss of previously enriched oxygen down as far as possible. According to the present invention, the method to achieve this objective essentially involves obtaining the amount of oxygen required by the consumer in addition to the recirculated oxygen from an oxygen source other than the pressure-swing adsorption system used for scrubbing the recirculated oxygen. Based on this premise, i.e, the existence of a separate source of oxygen which will supply the additional amount of oxygen required, and which complements the use of a pressure-swing adsorption system wherein the recirculated, oxygen-enriched gas is scrubbed, it will be possible to deploy a pressure-swing adsorption system, used for scrubbing purposes, of significantly smaller dimensions, thereby reducing the quantity of oxygen-enriched gas escaping from the equipment during the process of desorption or leaching of impurities. The preferred way to proceed in this context is to obtain the quantity of oxygen required in addition to the recirculated oxygen from bottles or small liquid containers in such cases where only small quantities are needed. In cases where large quantities are needed, preference is given to generating the additional oxygen from air in a separate pressure-swing adsorption system. Such a pressure-swing adsorption system will nevertheless have much smaller proportions than a pressure-swing adsorption system in which the scrubbing of the recirculated oxygen and the generation of the additional amount of oxygen required are performed simultaneously in the same device. Then the oxygen is recirculated. This occurs, in the case of an ozone consumer, by preceding it with an ozonizer and by adding the extra oxygen amount required via a pipe. When using the recirculated oxygen in oxygen-consuming processes, there naturally is no requirement for an ozonizer. For the use of recirculated oxygen in an ozonizer, certain safety measures must be observed which will be described in greater detail in a separate section of this report. In the case of oxygen consumers, however, it is possible to achieve an increase in efficiency by reducing desorption losses if, in accordance with the preferred procedure of the present method, one proceeds in such a fashion that gas lost in a pressure-swing adsorption system through desorption and restored in a regeneration process be fed, at least partially, into the flow of gas adsorbed from the consumer and subsequently recirculated through the pressure-swing adsorption system. This process, as an added bonus, occurs irrespective of whether the gas scrubbed in this fashion is used for oxygen-consuming purposes or the ensuing production of ozone. In such an instance, the recirculated flow of gas absorbs impurities and then is purged through desorption after it has reached a pre-determined concentration of pollutants.

When using the recirculated gas in an ozone consumer, it is a given that an ozonizer for the generation of new ozone must be placed into position. In this connection, the preferred way to proceed is to feed the oxygen adsorbed from the pressure-swing adsorption system into the ozonizer via an additional oxidation step for purposes of destroying inferior hydrocarbons, a step in which part of the ozone generated in the ozonizer is restored to its original oxidized state. In the course of such an oxidation step, the oxidation of especially volatile inferior hydrocarbons to O2 and H2O is easily facilitated. This is an important step which would otherwise take place in the ozonizer itself. If that were to occur, the water generated in the oxidation process would lead to a spark discharge rather than the desired silent discharge, thereby greatly inhibiting the effectiveness and efficiency of the ozonizer. To be sure, a high concentration of organic impurities and most inferior hydrocarbons will remain in the pressure-swing adsorption system. Even under the best of circumstances, however, residual amounts of hydrocarbons of more than 10 ppm together with the scrubbed gas escape from the pressure-swing adsorption system. Nonetheless, even such small quantities may lead to severe impairments of the safe operation of the ozonizer. It is not difficult whatsoever to reliably destroy any residual organic compounds, especially methane, in an oxidation process immediately following the pressure-swing adsorption system by feeding ozone into the pure flow of gas. When destroying these inferior hydrocarbons through ozone, water is one of the reaction products. It is, therefore, recommended that scrubbed gas adsorbed from a pressure-swing adsorption system undergo a drying process, especially if it has been subjected to the oxidation treatment. In this manner, defects of the ozonizer as a result of water condensation may be safely avoided.

It is possible however, to separate most of the organic impurities from the flow of gas prior to feeding the gas adsorbed from the oxygen consumer into the pressure-swing adsorption system, which, in turn, improves the charging time and runs of the smaller pressure-swing adsorption system unit. It is therefore recommended to utilize the present method by feeding the gas adsorbed from the consumer into the pressure-swing adsorption system via a scrubber and, if desired, via an acid separator. This process facilitates the removal of most of the impurities contained in the gas adsorbed from the consumers, especially long-chain contaminants and organic acids, prior to their entry into the pressure-swing adsorption system.

To ensure that no significant quantities of ozone escape into the atmosphere when removing the recirculated gases, through desorption via the pressure-swing adsorption system, for purposes of enriching the pollutants contained therein, it is recommended to proceed such that following desorption of the recirculated gas via the pressure-swing adsorption system upon it reaching a predetermined concentration of impurities, the recirculated gas is purged through an ozone filter, e.g. a charcoal filter. It is fairly easy to operate an ozone filter in the form of a charcoal filter whereby an ozone destroyer or an analog ozone filter is placed immediately following the ozone consumer when the gas adsorbed from the ozone consumer has reached a certain concentration of organic substances and in case significant amounts of ozone escape concurrently with the adsorbed gas. This arrangement is set up for purposes of avoiding the danger of an explosion in the equipment parts immediately succeeding the ozone consumer or in order to prevent ozone from escaping into the atmosphere.

Following the desorption of a pressure-swing adsorption system, in the process of which the remaining pollutants are released, the pressure-swing adsorption system, in turn, must be restored to its operating pressure required for the adsorption process. To that effect, it is advisable to proceed in such a fashion that, following desorption, the pressure-swing adsorption system designed for the scrubbing of recirculated gas is restored to its normal operating pressure by supplementing purified or additional oxygen. However, the most efficient use is achieved when the purified product gas required to restore the operating pressure is derived from one adsorber which is cyclically connected to additional adsorbers within the same pressure-swing adsorption system. Equally, the drying steps following the oxidation steps undergo desorption in the same sequence, preferably by proceeding in such a fashion that, in order to regenerate the drying stage, it is regenerated simultaneously with the adsorption containers of the pressure-swing adsorption system through evacuation and, if necessary, rinsing at the conclusion of the desorption step by means of a shared vacuum pump.

The energy required in the ozonizer is dependent on the ozone yield desired—the higher the yield the more energy is needed. According to the present invention, a method is being proposed to facilitate the recirculation of unused oxygen while, at the same time, minimizing the loss of oxygen, which makes it effective and economical to operate the ozonizer with a high oxygen through-put and a relatively low conversion rate into ozone and may, therefore, be operated with minimal use of energy.

Examples of ozone consumers are varied: water treatment facilities, pulp bleaching factories, hazardous waste clean-up facilities, especially facilities involving the disposal of hazardous substances generated by the chemical industry. Consumers of oxygen are found primarily in the field of oxygen biology, for instance, in connection with waste water treatment plants and similar facilities. As was mentioned earlier, for the production of ozone it is essential that dried oxygen be used and that inferior hydrocarbons be removed to the greatest degree possible. In the case of pulp bleaching plants, a significant portion of the decomposition substances in ozone consist of humic acids derived from delignification processes; for the most part, such humic acids may be removed by means of a washer. The use of the washer also results in a reduction in the recirculated gas' temperature with positive implications for the following pressure-swing adsorption system. The washer may be followed by an acid separator, thus advantageously sequencing such an acid separator behind the washer, since here, too, the temperature reduction achieved in the washer is beneficial in that the acids for the most part have already been removed at that stage.

Following, the invention is described in detail with reference to the accompanying drawings in which FIG. 1 shows schematically the embodiment of the equipment used for carrying out the present method, and in which FIG. 2 shows schematically the embodiment of a pressure-swing adsorption system designed for scrubbing the flow of gas adsorbed from an oxygen or ozone consumer.

FIG. 1 shows an oxygen fan 1 which supplies highly purified oxygen directly to either an oxygen consumer 2 or, via an ozonizer 3, to an ozone consumer 4. This highly purified oxygen is generated primarily in a pressure-swing adsorption system 5 into which gas adsorbed from consumers 2 or 4 is fed, as will be described in further detail below. To a lesser degree, the oxygen is derived from an additional oxygen source to supplement the oxygen used up in the consumers. This oxygen source could consist of an oxygen bottle 6, in the case of a small quantity of additional or substitute oxygen required, and, in the case of a higher requirement for oxygen, it could be an additional pressure-swing adsorption system 7 designed to decompound air.

The gas adsorbed from consumers 2 or 4 via the pipe 8 undergoes a pre-treatment, depending on its designated use, for purposes of performing an initial cleansing or cooling-off of that gas which, in turn, improves the effectiveness of the pressure-swing adsorption system 5. And in the example of impurity-enriched gases derived from a pulp bleach facility, the equipment set-up may include an acid separator 9 followed by a heat exchanger 10. It is also possible to precede the acid separator 9 with a washer 11 which performs a partial scrubbing of the gas flow and, simultaneously, effects a reduction in temperature, thereby improving the efficiency of the succeeding acid separator 9.

From the pressure-swing adsorption system 5 used for scrubbing the oxygen-enriched gas for use in consumer 2 or 4, highly purified oxygen, on the one hand, is recirculated through a pipe 12 to the oxygen fan 1 and is then led to pass through a vacuum pump 13 where, during desorption from the pressure-swing adsorption system 5, impurities and residual oxygen especially are extracted through pipe 14.[1] Simultaneously, desorption occurs via a pipe 29 at the drying stage which follows the oxidation step. In order to recover most of the oxygen contained in the desorption flow circulating through pipe 14, i.e., in order to achieve a correspondingly high concentration of impurities in the desorption flow, most of the desorption flow extracted via the vacuum pump is recirculated via a pipe 15 to the gas flow of consumers 2 or 4 which, in turn, had been extracted via pipe 8, and thus is returned to the pressure-swing adsorption system 5. By controlling a valve 16 in a certain manner, a part of the desorption flow, upon having reached a sufficient concentration of impurities, will be extracted via filter 17, which, in the case of an ozone consumer 4, could be, by way of example, a charcoal filter designed to control ozone concentrations in accordance with safety regulations, and via a pipe 18.[2]

[1] In the German original, the "on the one hand" sentence is not followed by an "on the other hand" sentence. (The transl.).
[2] In the German original, the last part of the sentence is left dangling like in the translation (the Transl.)

When using the equipment depicted in FIG. 1 with an oxygen consumer 2, it is generally possible to recirculate the oxygen adsorbed from the pressure-swing adsorption system 5 and subsequently scrubbed, directly to the oxygen consumer 2 after having supplemented it with oxygen as may be required from the additional oxygen sources 6 or 7. When using the equipment with an ozone consumer, it is essential that only oxygen which has been previously dried and, more importantly, which is free of inferior hydrocarbons, especially methane, is recirculated to the ozone consumer 4 to ensure safe and efficient operation of the ozonizer 3. Although most of the impurities in the gas flow adsorbed from the consumer were removed in the devices preceding the pressure-swing adsorption system 5 or in the pressure-swing adsorption system 5 itself, whereby the value for inferior hydrocarbons, especially methane, which are adsorbed in the scrubbed gas flow by the pressure-swing adsorption system 5, generally exceeded 10 ppm, a value which is generally too high to ensure the safe and efficient operation of the ozonizer 3.[3] Therefore, it is intended, in order to further reduce the concentration of inferior hydrocarbons, to feed, via a branch pipe 19, ozone generated in an ozonizer 3 into an oxidation step following a pressure-swing adsorption system 5, a step in which, by adding ozone at this juncture, inferior hydrocarbons, especially methane, are destroyed immediately. Subsequently, a drying process 20 takes place to dry the pure gas which had been treated in such a fashion and which has been subsequently adsorbed from the pressure-swing adsorption system 5. During the drying process, the water which ensued, among others, from the destruction of the inferior hydrocarbons is removed from the oxygen flow. The procedure followed for the removal of inferior hydrocarbons from the gas adsorbed and scrubbed by the pressure-swing adsorption system 5 is explained in greater detail in FIG. 2.

[3] Sentence incomplete in the German original text. (The transl.)

By using a pressure-swing adsorption system 5 exclusively for scrubbing the contaminated gas adsorbed from consumers 2 or 4, it is possible to keep the size of such pressure-swing adsorption system 5 relatively small. At the same time, it facilitates, through partial recirculating of the desorbed gas flow, achieving a higher concentration of impurities in the gas flow adsorbed via pipe 18 and, consequently, a reduction in the loss of oxygen.[4] Furthermore, the pressure-swing adsorption system 5 works extremely efficiently in the area of 80% since the gas supplied from the consumers has a higher oxygen content than air, despite the impurities contained therein. Consequently, only a small amount of oxygen is required from the additional oxygen sources 6 or 7. If the additional oxygen required is derived from an additional pressure-swing adsorption system 7, the device need not be large, since it is designed exclusively to supply the additional oxygen required, and not all the highly purified oxygen required by the oxygen consumer 2 or the ozonizer 3 and the ozone consumer 4.

[4] Sentence incomplete in the German original. (The transl.)

The pressure-swing adsorption system 5 shown in FIG. 2 is designed for cycle operations and consists of three pressure-swing adsorbers 21 which emit the scrubbed gas into a pipe 12. The gas from the consumers 2 or 4, and which have been partially scrubbed and/or cooled down, as the case may be, is fed into the pressure-swing adsorber via the pipe 8 and via valves 22. In turn, product gas, scrubbed and having a high oxygen content, is led from the pressure-swing adsorbers via valves 23 to the drying devices 20 containing a gel for purposes of removing water. The equipment shown in this particular drawing is designed for use with an ozone-consuming process, wherein following the individual pressure-swing adsorber ozone is lead via valves 24 for purposes of destroying inferior hydrocarbons, especially methane. In the desorption process, highly contaminated gas is adsorbed from the pressure-swing adsorbers via a vacuum pump 13 and via valves 25. In this process, the three pressure-swing adsorbers follow a cycle operation, i.e., at any given time the following operations occur simultaneously: one adsorber is loaded; from one adsorber, impurities are desorbed; and the third adsorber is recharged to operating pressure by adding purified or substitute oxygen. In order to restore operating pressure to the adsorbers, the valves 26 immediately preceding a pipe 12 are closed, which then causes oxygen to flow from said pipe 12 into the dryer 20 and into the pressure-swing adsorber 21 via valves 27, with valve 23 remaining open. During this phase, it is possible to perform a rinse with purified or substitute oxygen via valves 27. In order to clean the dryers 20, an evacuation of the dryers may be performed in pipe 29 via valves 28 by means of a vacuum pump 13.

What is claimed is:

1. A method for producing at least one of oxygen and ozone for a consumer, wherein residual oxygen gas circulated from the consumer is first scrubbed and then adsorbed in a pressure-swing adsorption system and, subsequently, is recirculated, at least partially, to the consumer, and wherein oxygen required in addition to the recirculated amount of oxygen for the proper operation of the consumer is obtained from an oxygen source separate from the pressure-swing adsorption system, said method producing ozone when oxygen is recirculated through an ozonizer to the consumer.

2. A method, as claimed in claim 1, wherein gas desorbed from the pressure-swing adsorption system is, at least partially, fed into the gas adsorbed from the consumer and, subsequently, is recirculated via the pressure-swing adsorption system.

3. A method, as claimed in claim 1 or 2, wherein the oxygen adsorbed from the pressure-swing adsorption system and fed into the ozonizer is fed into the ozonizer via an oxidation step to destroy inferior hydrocarbons and whereby a portion of the ozone generated in the ozonizer is restored to an oxidation state.

4. A method, as claimed in claim 1 or 2, wherein the gas scrubbed and adsorbed by the pressure-swing adsorption system undergoes a drying process.

5. A method, as claimed in claim 1 or 2, wherein the gas adsorbed from the consumer is circulated to the pressure-swing adsorption system via a washer and an acid separator.

6. A method, as claimed in claim 1 or 2, wherein desorbed gas, following its recirculation through the pressure-swing adsorption system and upon reaching a predetermined concentration of impurities, is purged via an ozone filter.

7. A method, as claimed in claim 1 or 2, wherein the pressure-swing adsorption system, designed to scrub the recirculated gas, following desorption, is restored to operating pressure by supplementing it with additional oxygen.

8. A method, as claimed in claim 4, wherein a device for performing the drying process, as well as adsorption containers of the pressure-swing adsorption system, are regenerated through evacuation.

9. A method, as claimed in claim 1 or 2, wherein the ozonizer is operated with high oxygen throughput and with a less than maximum conversion ratio of oxygen to ozone.

10. A method, as claimed in claim 1 or 2, wherein the source of oxygen required in addition to the recirculated oxygen, is a separate pressure-swing adsorption system designed to generate additional oxygen from air which is mixed oxygen recirculated to the consumer.

* * * * *